United States Patent [19]

Morton

[11] Patent Number: 5,673,100
[45] Date of Patent: Sep. 30, 1997

[54] METHOD FOR ENLARGING IMAGES FOR LENTICULAR PRINTS

[75] Inventor: Roger A. Morton, Penfield, N.Y.

[73] Assignee: Eastman Kodak Company, Rochester, N.Y.

[21] Appl. No.: 331,787

[22] Filed: Oct. 31, 1994

[51] Int. Cl.$^6$ .................................................. G03B 27/32
[52] U.S. Cl. ............................................. 355/22; 355/77
[58] Field of Search .............................. 355/22, 77, 133

[56] References Cited

U.S. PATENT DOCUMENTS

| | | | |
|---|---|---|---|
| 3,028,785 | 4/1962 | Leach | 355/22 |
| 4,494,864 | 1/1985 | Smith et al. | 355/22 |
| 5,276,478 | 1/1994 | Morton | 355/22 |
| 5,302,989 | 4/1994 | Taguchi et al. | 354/112 |

FOREIGN PATENT DOCUMENTS

94/02874  2/1994  WIPO.

OTHER PUBLICATIONS

*Three–Dimensional Imaging Techniques*, Takanori Okoshi, New York: Academic Press, 1976, pp. 64–77 (translated from the Japanese edition published in 1972).

*Primary Examiner*—R. L. Moses
*Attorney, Agent, or Firm*—Gordon M. Stewart

[57] ABSTRACT

A method for making large format lenticular 3-D images by enlarging a smaller source image utilizes an optical enlarger that is calibrated by forming a first reference image pattern from a first piece of lenticular material having the same pitch as a second piece of lenticular material, and a second reference image comprising lines having a pitch corresponding to the spacing between the same views of the source image. The source image is derived by photographing an original scene from different views taken from spaced apart positions. The first reference image is positioned at a copy plane and the second reference image is positioned at the source plane. The relative orientation of the reference images are adjusted to provide a Moiré pattern that achieves desired spacing and parallelism. With the adjustment of the enlarger optics completed, the source image is positioned at the source plane and an enlargement is made at the copy plane. The enlarged image, formed at the copy plane, will accurately align with the lenticules of the second piece of lenticular material to provide a superior large format lenticular 3-D image.

9 Claims, 1 Drawing Sheet

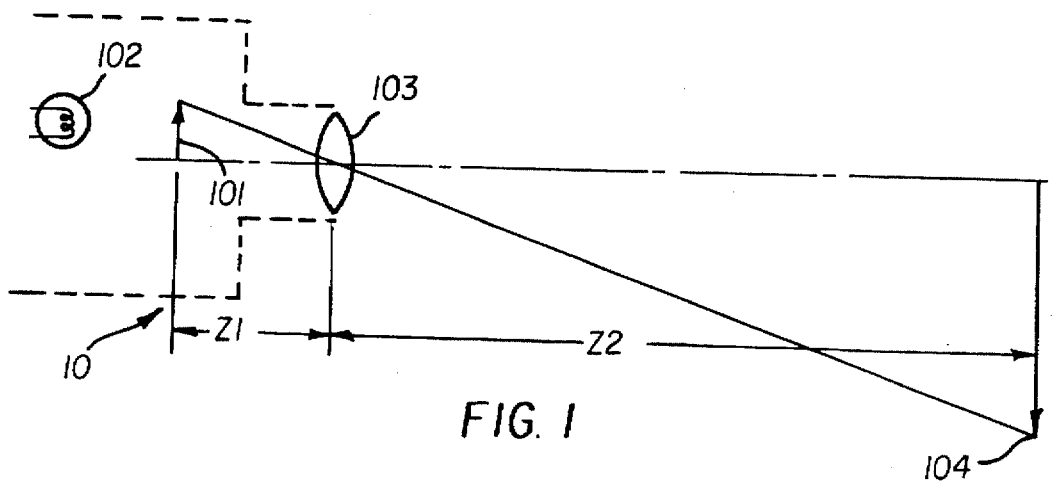
FIG. 1
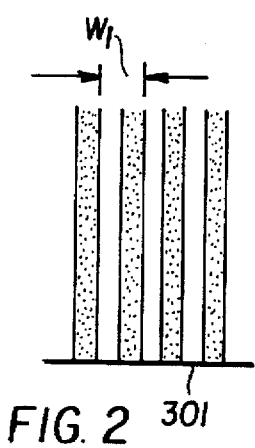
FIG. 2
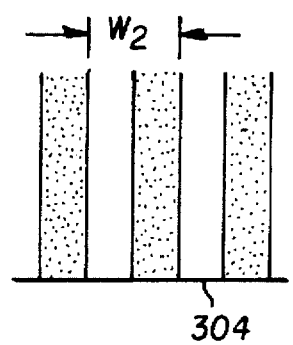
FIG. 3
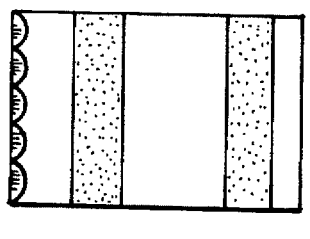
FIG. 4 DIRECTION OF LENTICULAR MATERIAL

METHOD FOR ENLARGING IMAGES FOR LENTICULAR PRINTS

FIELD OF INVENTION

This invention relates to methods for making enlarged prints and more specifically to a method for making enlarged 3-D image prints with the use of a lenticular material.

BACKGROUND OF THE INVENTION

There are basically two methods for making 3-D images. One is called lenticular 3-D imaging; the other is called barrier 3-D imaging. Lenticular images can be made either by pre-printing the image and then laminating the resulting image against lenticular material using very accurate scaling and positioning alignment. This method requires special exposure or electronic printing techniques. One disadvantage of this method is that the printer, printing the film material, must have the same format as the final image. Printers up to size 16×20 are generally available; however, printers for larger formats would be prohibitively expensive.

The other method for lenticular printing involves printing directly through the lenticular material. This has the disadvantage that the optical artifacts of the lenticular material are duplicated in both the printing and the viewing operations.

To overcome this problem it is proposed to enlarge the images made on a smaller format printer. In the past this approach has not been practical because the accuracy and alignment required to obtain the correct scaling and overall linearity has not been available.

SUMMARY OF THE INVENTION

The present method provides a technique for accurately setting up an optical copying arrangement to enable images to be generated whose scale corresponds exactly to the scale of the lenticular material to be used in the final image.

This is achieved by generating reference images which can be used to accurately and precisely adjust the enlarging optics so that the magnification, linearity, and resolution correspond to that required for the enlarged images.

In the preferred method for making large format lenticular 3-D images by enlarging a smaller 3-D source image the steps are:

a) forming a Moiré pattern between the source plane and the image plane of the enlarging device, and b) adjusting the enlargement optics based on the characteristics of the Moiré pattern.

With the aforementioned adjustment, the source image is placed in the enlarger and the enlarged image is formed.

From the foregoing it can be seen that it is a primary object of the present invention to provide an improved method for making large 3-D images.

It is another object of the present invention to provide an enlarging method for 3-D images that provides for improved alignment an accuracy of enlargement.

It is another object of the present invention to provide a relatively inexpensive method for forming large 3-D prints.

The above and other objects of the present invention will become more apparent when taken in conjunction with the following description and drawings wherein like characters indicate like parts and which drawings form a part of the present invention.

BRIEF DESCRIPTION OF THE DRAWINGS

FIG. 1 illustrates a typical optical enlarging configuration.

FIG. 2 illustrates an image of alternate black and white lines having a pitch of $W_1$ corresponding to a calibration image where $W_1$ is the same as the spacing between lines of the same view in the source image.

FIG. 3 illustrates an enlarged image derived from the FIG. 2 image with a spacing of $W_2$.

FIG. 4 illustrates a pattern that would be generated during the calibration process.

DETAILED DESCRIPTION OF THE INVENTION

FIG. 1 illustrates the positions of a source image 101, positioned at a source plane, and an enlarged image 104 formed at a copy plane utilizing a standard enlarger 10. A light source 102 provides the illumination which passes through the source image 101 and is focused by optics 103 onto the copy plane. The magnitude of the enlargement is determined by the ratio of the distances Z1 and Z2. In the preferred embodiment of the invention the source image is derived by taking photographs of an object (scene) at different viewing angles and slicing each of the photographs into strips with like strips from each photograph positioned adjacent to each other in a repetitive fashion with a lenticular sheet affixed to the strip-formed image (as taught in U.S. Pat. No. 5,276,478 entitled "Method And Apparatus For Optimizing Depth Images By Adjusting Print Spacing" by Roger A. Morton and generally per the teaching of Takanori Okoshi in the book entitled *Three-Dimensional Imaging Techniques*, New York: Academic Press, 1976, pps. 64–77 (translated from the Japanese edition published in 1972).

Referring to FIG. 2, in this invention when the source image 101 is created, another image 301, comprising parallel lines which are alternately black and white and having the same pitch as the spacing between lines corresponding to the same view of the original scene on the source image 101, is also created. This image is a source or reference calibration image. The alternate black and white lines are provided with a pitch (spacing) $W_1$ corresponding to the source image where $W_1$ is the same spacing between lines of the same view in the source image 101.

The first step of the calibration process is to insert the parallel black and white line image 301 into the enlarger 10 at the source plane.

Referring to FIG. 3, an enlarged calibration or reference image 304 for the copy plane is generated by contact printing a first piece of lenticular material corresponding to a second piece of lenticular material that is to be laminated to a piece of film having the size and base required by the final enlarged image. This calibration image will also contain parallel black and white lines of spacing $W_2$, where the spacing $W_2$ corresponds to the spacing that would occur if the desired enlargement, having the spacings $W_1$, is made. The reason this first piece of material is used in place of the second piece is that the calibration technique is always implemented with the first piece while each formed image is laminated to a second piece of material.

The desired magnification of the imaging system shown in FIG. 1 therefore is $W_2/W_1$. To achieve this magnification the calibration image is inserted in the copy plane. The alignment of the source calibration image is the same as the intended alignment of the source image which will be subsequently placed in the source image plane. The alignment, or lack thereof, between these two images is seen at the copy plane when the light source 102 is turned on. The two calibration images sometimes referred to as first and second reference images are adjusted at the source and copy planes so that there is 1 to 5 angular degrees difference in orientation between them.

At this orientation a Moiré pattern is formed and the distances Z1 and Z2 are adjusted so that, as shown in FIG. 4, the Moiré pattern is close to right angles to the long lens direction of the lenticular material and the contrast and edge sharpness of the Moiré pattern is at its maximum value.

Once this point is reached, it is now necessary to adjust the angular relationship of the copy plane and optics (or alternatively any two of the three elements, the source calibration image, the optics 103 or the copy calibration image). These angles are adjusted so that the Moiré lines shown in FIG. 4 are both parallel and straight.

Once the adjustments are made to ensure that the Moiré lines are both substantially parallel and straight, the copy plane calibration image is rotated 1 to 5 degrees until a uniform gray image is seen in the copy plane. If this uniform gray image is not achieved, it indicates that the angular adjustment referred to above has not been satisfactorily performed. Alternatively, if an offset in magnification between the lenticular pattern and the desired enlarged image, formed at the copy plan, is required, then a Moiré pattern may be achieved with a number of parallel Moiré lines which may be analytically or experimentally determined. The experimental process involves exposing film to form an enlarged image at the copy plane at a magnification corresponding to an observed number of Moiré fringes and then assessing if this enlarged image, when laminated to lenticular material, produces a satisfactory 3-D image with the appropriate viewing conditions. If not, adjustments to the magnification and the appropriate number of Moiré fringes may be made.

Once the uniform image or desired Moiré pattern is achieved, the source calibration image and the copy calibration image are removed and the light source turned off. The desired image to be magnified is then inserted at the source plane and a piece of unexposed film is inserted at the copy plane. The illumination source is then turned on to expose the film in the copy plane and the film is developed.

The developed film is used to form the enlarged image that is laminated by any one of the well known techniques for laminating lenticular material to film or a print to the same type of lenticular material used to form the calibration image for the copy plane.

While there has been shown what is considered to be the preferred embodiment of the invention, it will be manifest that many changes and modifications may be made therein without departing from the essential spirit of the invention. It is intended, therefore, in the annexed claims, to cover all such changes and modifications as may fall within the true scope of the invention.

Parts List

10 Enlarger
101 Source image
102 Light source
103 Optics
104 Enlarged image
301 Source Calibration image
304 Enlarged calibration image
$W_1$ & $W_2$ Pitch
Z1 & Z2 Distances

I claim:

1. A method for making large format lenticular 3-D images by enlarging a smaller 3-D source image comprising the steps of:

a) forming a Moiré pattern between the source plane and the image plane of the enlarging device; and b) adjusting the enlargement optics based on the characteristics of the Moiré pattern.

2. The method according to claim 1 wherein the Moiré pattern is formed by positioning a first reference image of lenticular material having the same pitch as the image to be magnified at the source plane and a second reference image of lenticular material having a pitch corresponding to a desired enlargement at the copy plane.

3. The method according to claim 2 wherein the enlarging optics is adjusted by focusing the Moiré pattern formed at right angles to the lenticular material.

4. A method for making large format lenticular 3-D images by utilizing an optical enlarger that is calibrated to enlarge a smaller image derived by photographing an original scene taken from spaced-apart positions by the steps of:

forming a first reference image pattern from a piece of lenticular material;

positioning the smaller image into an enlarger at the source plane;

positioning the first reference image into the enlarger at the copy plane;

adjusting the enlarger to produce a desired Moiré pattern;

removing the first reference image from the enlarger and positioning a film at the copy plane of the enlarger; and exposing the film to the enlarged smaller image to provide the desired large format image for use in making a 3-D image using the lenticular material.

5. The method according to claim 4 and further comprising the step of:

forming a second reference image pattern having the same spacing between lines of the same view in the smaller image.

6. The method according the claim 4 and further comprising the step of:

adjusting the relative orientation between the smaller image and the first reference image to provide a Moiré pattern.

7. A method for making large format lenticular 3-D images by utilizing an optical enlarger that is calibrated to enlarge a smaller image derived by photographing an original scene taken from spaced-apart positions by the steps of:

forming a first reference image pattern from a piece of lenticular material;

forming a second reference image pattern having the same spacing between lines of the same view in the smaller image;

positioning the second reference image into an enlarger at the source plane;

positioning the first reference image into the enlarger at the copy plane;

adjusting the enlarger to produce a desired Moiré pattern;

removing the first and the second reference images from the enlarger and positioning the smaller image to be enlarged at the source plane of the enlarger and a film at the copy plane of the enlarger; and exposing the film to the enlarged smaller image to provide the desired large format image for use in making a 3-D image using the lenticular material.

8. The method according to claim 7 and further comprising the step of:

adjusting the relative orientation between the first and the second reference plane images to provide a Moiré pattern.

9. The method according to claim 7 and further comprising the step of:

providing a second piece of lenticular material equal to the first piece, with the second piece of lenticular being laminiated to the desired format image.